US010303212B2

(12) United States Patent
Wang et al.

(10) Patent No.: US 10,303,212 B2
(45) Date of Patent: May 28, 2019

(54) ROTARY COMBINATION MODULE FOR TABLET COMPUTER

(71) Applicant: ACER INCORPORATED, New Taipei (TW)

(72) Inventors: Yung-Chih Wang, New Taipei (TW); Jian-Siang Wang, New Taipei (TW); Cheng-Mao Chang, New Taipei (TW); Wen-Neng Liao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 309 days.

(21) Appl. No.: 15/073,621

(22) Filed: Mar. 17, 2016

(65) Prior Publication Data
US 2016/0370826 A1 Dec. 22, 2016

(30) Foreign Application Priority Data

Jun. 17, 2015 (TW) .............................. 104119500 A

(51) Int. Cl.
G06F 1/16 (2006.01)
(52) U.S. Cl.
CPC ............ *G06F 1/1632* (2013.01); *G06F 1/166* (2013.01); *G06F 1/1626* (2013.01); *G06F 1/1669* (2013.01); *G06F 1/1683* (2013.01)
(58) Field of Classification Search
CPC ..... G06F 1/1632; G06F 1/1683; G06F 1/1626
USPC .................................................... 361/679.55
See application file for complete search history.

(56) References Cited

U.S. PATENT DOCUMENTS

| 7,103,698 | B2* | 9/2006 | Zhang | G06F 1/1632 361/679.3 |
| 7,652,873 | B2* | 1/2010 | Lee | E05B 65/006 248/917 |
| 8,464,995 | B2* | 6/2013 | Yang | F16M 11/10 248/454 |
| 2008/0232061 | A1* | 9/2008 | Wang | G06F 1/1632 361/679.41 |
| 2012/0275094 | A1* | 11/2012 | Zhou | H04M 1/04 361/679.01 |
| 2013/0027866 | A1* | 1/2013 | Williams | F16M 11/041 361/679.22 |
| 2013/0286623 | A1* | 10/2013 | Slipy | H04M 1/0202 361/807 |
| 2013/0335914 | A1* | 12/2013 | Lee | G06F 1/1632 361/679.41 |

FOREIGN PATENT DOCUMENTS

| CN | 2610385 Y | 4/2004 |
| CN | 101592977 A | 12/2009 |
| CN | 101950201 A | 1/2011 |
| CN | 103216712 A | 7/2013 |

(Continued)

Primary Examiner — Rockshana D Chowdhury
(74) Attorney, Agent, or Firm — Winston Hsu

(57) ABSTRACT

A rotary combination module for a tablet computer, which includes a pad and a dock, to engage the pad with the dock, the rotary combination module comprising: a rotation part, disposed on the back of the pad, for rotating on the pad as a rotation plane; an extension part, connected with the rotation part, for shifting in the rotation part and positioning at a predetermined location; and a stand, connected to the extension part, for turning away from the extension part and positioning at a predetermined angle.

11 Claims, 10 Drawing Sheets

(56) References Cited

FOREIGN PATENT DOCUMENTS

| TW | 563724 | 11/2003 |
|----|--------|---------|
| TW | M330688 | 4/2008 |
| TW | 201428451 A | 7/2014 |
| TW | 201445288 A | 12/2014 |
| TW | I479975 B | 4/2015 |
| TW | 201516627 A | 5/2015 |

\* cited by examiner

ROTARY COMBINATION MODULE FOR TABLET COMPUTER

BACKGROUND OF THE INVENTION

1. Field of the Invention

The present invention relates to a structure for combining a pad and a dock of a tablet computer, and more particularly to a non-directional combination structure for combining the pad and the dock.

2. Description of the Prior Art

Current combination structure for two-in-one tablet computer adopts single-side combination manner to combine the pad and the dock, hence the user can use the pad only by horizontal, such as an ordinary laptop. However, the horizontal pad is suitable for watching videos, but not appropriate for reading documents (e.g., electronic books) or browsing webpages. The vertical pad is the most suitable mode for reading documents and browsing webpages. Besides, as to the pad of the two-in-one tablet computer, wide viewing angle and non-directional pads are generally chosen to satisfy multi-directional utilization. Thus, one directional or single-side combination structure cannot take the multi-directional advantages of the pad.

In addition, the current commercial tablet computer is applied with tenon and mortise structure to combine the pad and the dock, but the position of the tenon and mortise structure usually locates at the bottom of the pad. There is no tenon and mortise structure at lateral or other sides. Therefore, the pad cannot be used by vertical and combined with the dock.

SUMMARY OF THE INVENTION

It is therefore a primary objective of the present invention to provide a rotary combination module for a tablet to combine the pad and the dock to solve the problems described above.

An embodiment of the present invention discloses a rotary combination module for a tablet computer, which includes a pad and a dock, to engage the pad with the dock, the rotary combination module comprising a rotation part, disposed on the back of the pad, for rotating on the pad as a rotation plane; an extension part, connected with the rotation part, for shifting in the rotation part and positioning at a predetermined location; and a stand, connected to the extension part, for turning away from the extension part and positioning at a predetermined angle.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
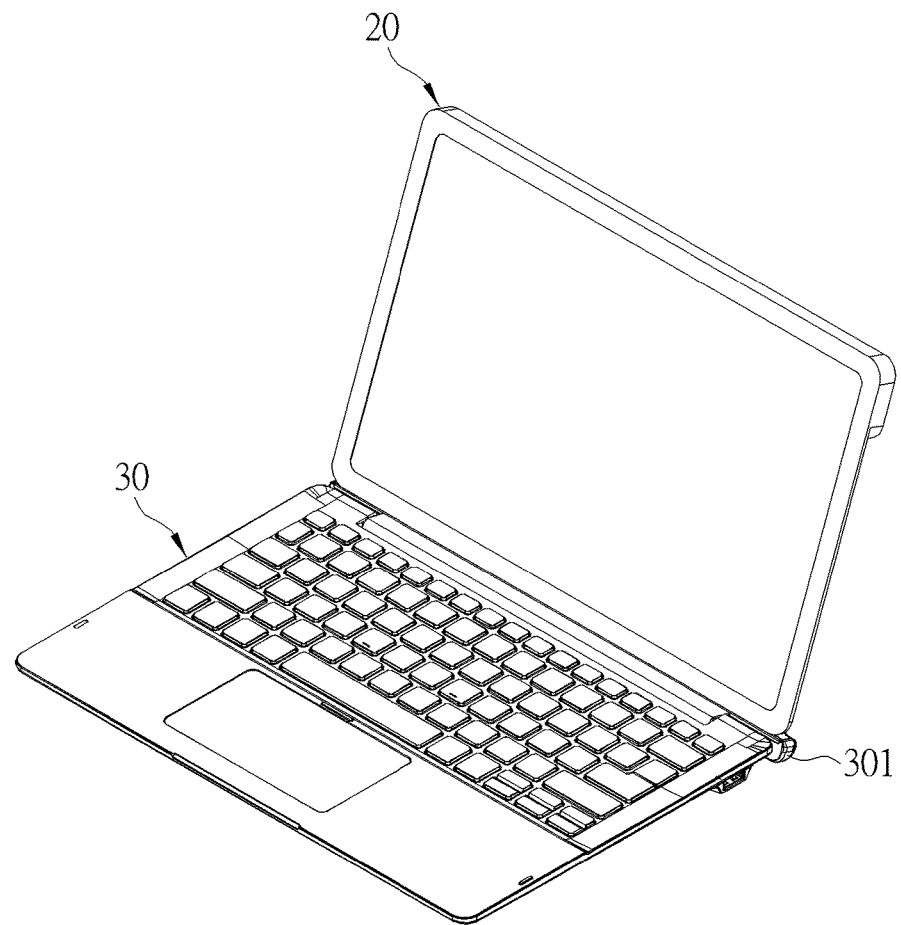
FIGS. 1A and 1B are schematic diagrams of a horizontal combination and a vertical combination for a tablet computer according to an embodiment of the present invention.
Figure 1B:
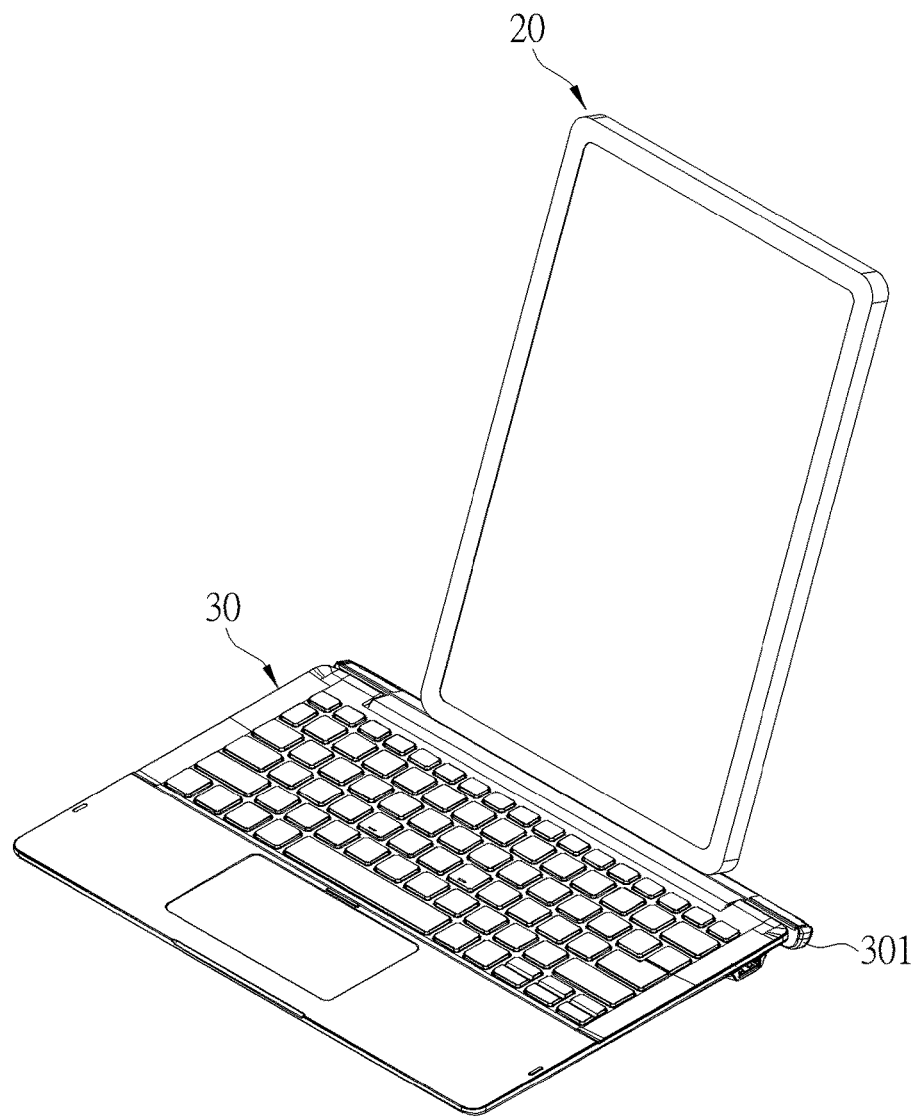

The present invention aims at non-directional combination function to enable two-in-one pad not only horizontally, but also vertically combining with the dock, and thoroughly takes advantages of wide viewing-angle pad. Please refer to FIGS. 1A and 1B, which illustrates a horizontal combination and a vertical combination for a tablet computer. FIG. 1A is a schematic diagram of the pad horizontally combining with the dock and FIG. 1B is a schematic diagram of the pad vertically combining with the dock. The dock 30 includes a fixed seat 301, wherein the fixed seat 301 can be rotated to adjust leaning angle of the pad for uses. Notably, the primary technique of the present invention is to enhance ability of the pad 20 in combination with the dock 30 in vertical, and improve the stability of the pad 20 in combination with the dock 30 in horizontal. Therefore, the present invention does not limit a structure of the fixed seat 301 of the dock 30 in conjunction with the pad 20, the structure of the fixed seat 301 in conjunction with the pad 20 can be a tenon and mortise or any other way.

Figure 2A:
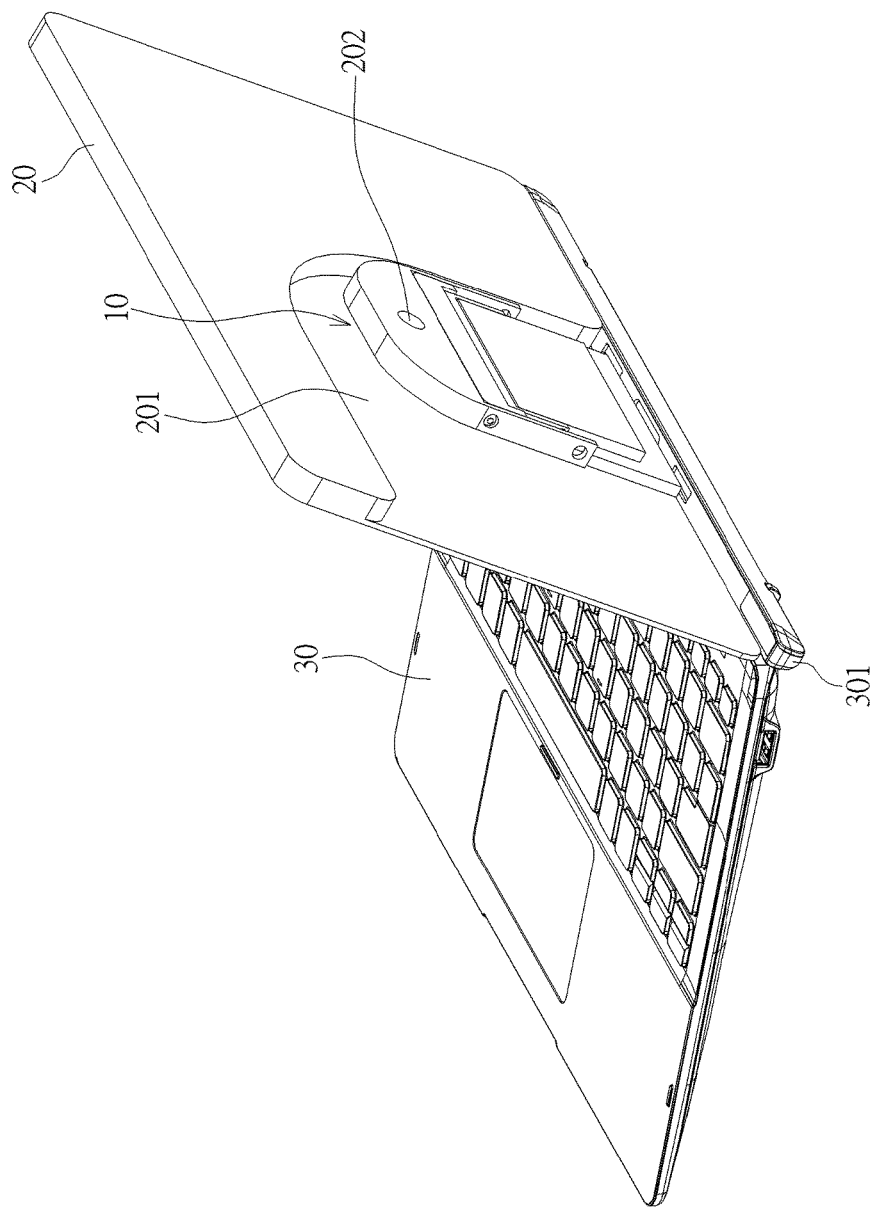
FIGS. 2A and 2B are schematic diagrams of a utilization of a rotary combination module according to an embodiment of the present invention.
Figure 2B:
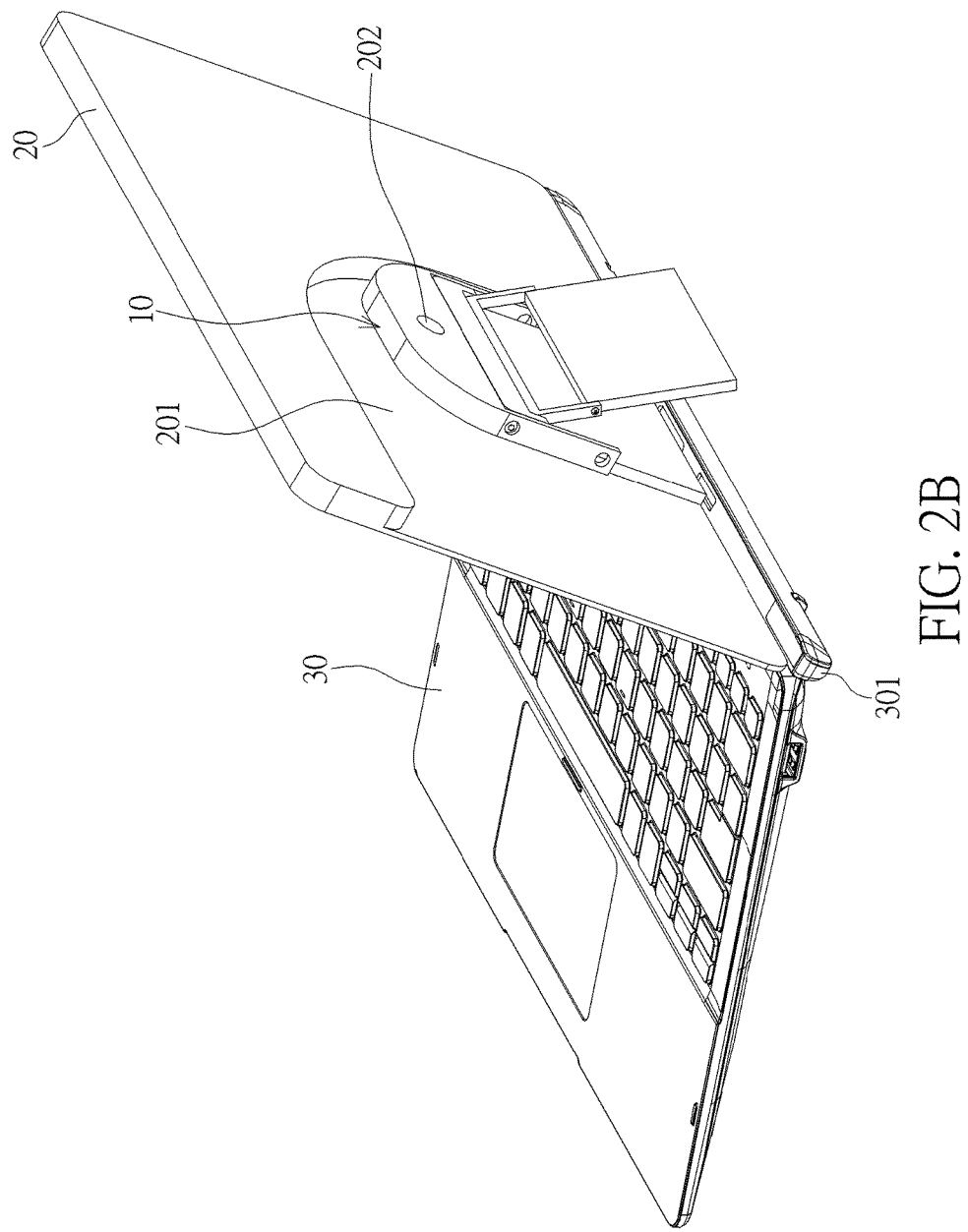

To realize the horizontal or vertical combination of the pad 20 and the dock 30 as shown in FIGS. 1A and 1B, the present invention discloses a structure of a rotary combination module 10 to horizontally or vertically combine the pad 20 with the dock 30. Please refer to FIGS. 2A and 2B, the rotary combination module 10 of the present invention is disposed on a back side of the pad 20 (as shown in FIG. 2A) to support the pad 20 (as shown in FIG. 2B.) Therefore, compared to the prior arts of which the dock 30 is combined with the pad 20 only by the fixed seat 301, the rotary combination module 10 of the present invention enables the pad 20 to combine with the dock 30 more firmly.

Figure 3:
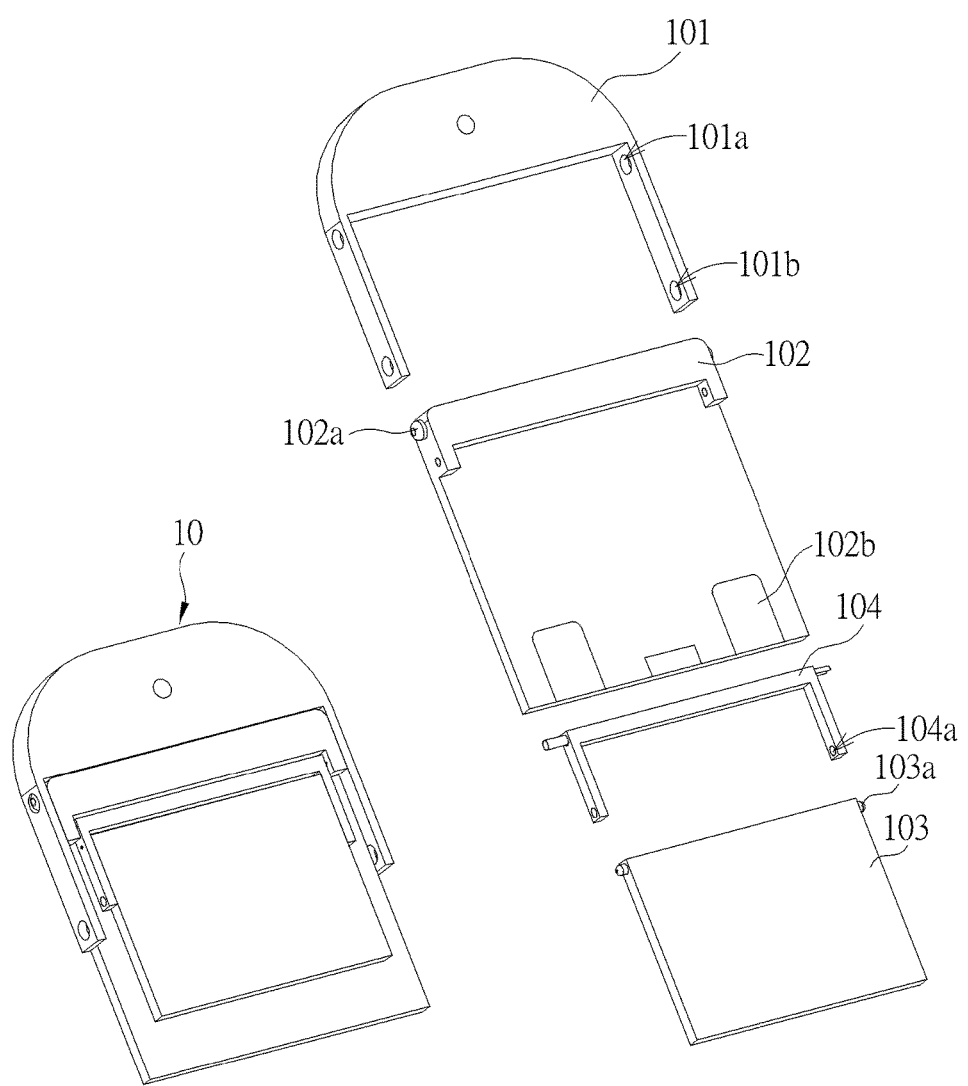
FIG. 3 is a schematic diagram of an exploded view of a rotary combination module according to an embodiment of the present invention.

Please refers to FIG. 3 for specific structure of the rotary combination module 10 of the present invention, and please refer to FIGS. 2A and 2B as well. As shown in FIG. 3, the rotary combination module 10 includes a rotation part 101, an extension part 102 and a stand 103. The rotation part 101 joints the back of the pad 20 by a pivot 202 with a center of the pivot 202 and rotates clockwise or counterclockwise on the back of the pad 20. The extension part 102 wedges a mortise 101a of the rotation part 101 by a tenon 102a, and connects to the rotation part 101, wherein the tenon 102a is pressed and is arranged on the extension part 102, such that the tenon 102a can up-and-down shift between the mortise 101a and 101b of the rotation part 101, which drives the extension part 102 to move up and down relative to the rotation part 101. The stand 103 wedges the extension part 102 by an axis 104, wherein the stand 103 can fold relative to the extension part 102 with the axis 104.

In an embodiment, as shown in FIG. 2A, a slot 201, which matches a rotating area of the rotary combination module 10, is arranged on the back of the pad 20 for restricting a rotating angle of the rotary combination module 10. In another embodiment, the rotating angle of the rotary combination module 10 is not restricted by the slot 201, but a fixed design of rotating angle with 90 degrees, 180 degrees, 270 degrees or 360 degrees.

Figure 4:
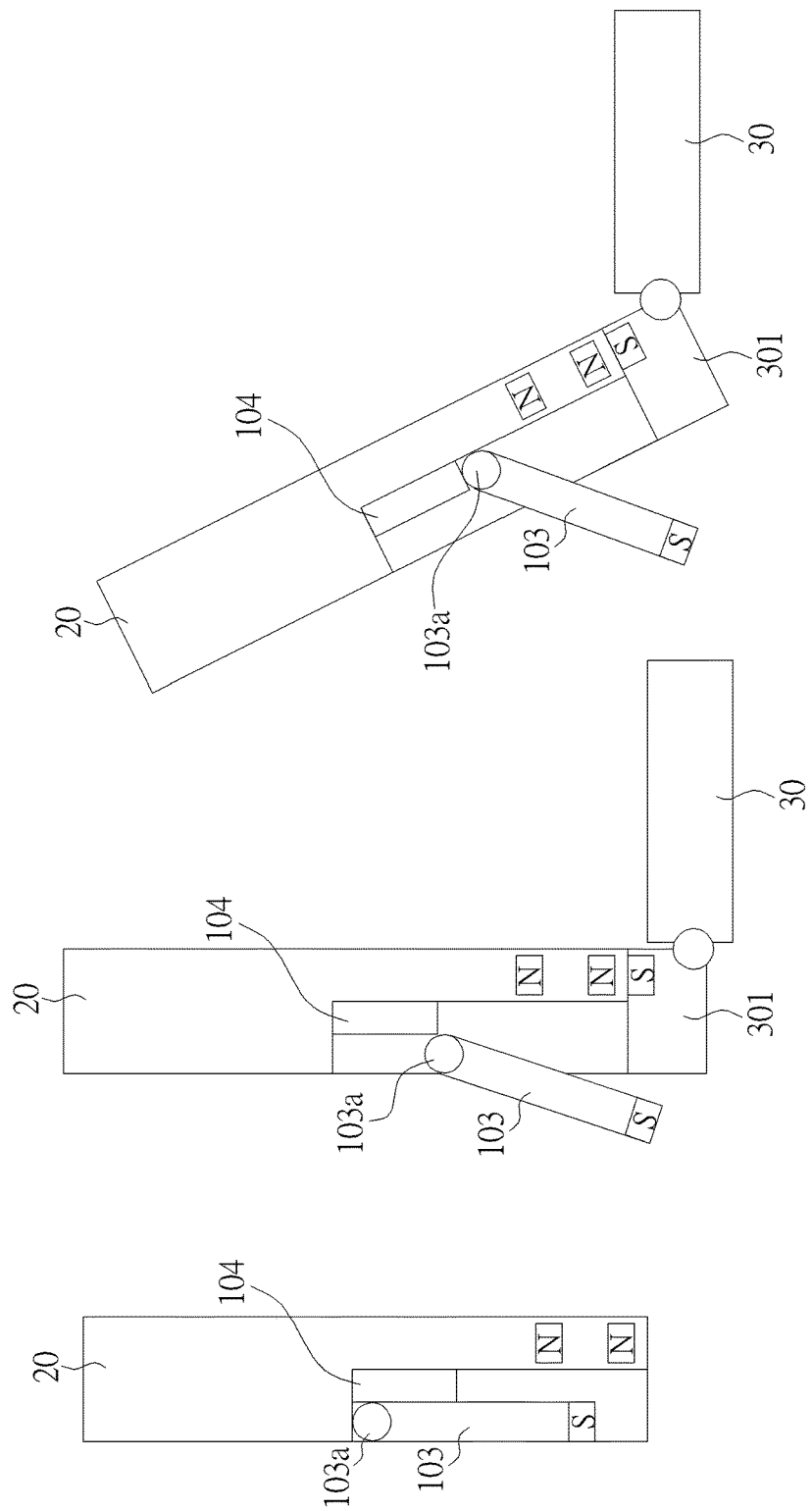
FIG. 4 is a schematic diagram of an operation of a rotary combination module in horizontal according to an embodiment of the present invention.

In addition, please refer to FIG. 4, a first magnetic element S is disposed on the bottom of the stand 103, and a second magnetic element N is disposed on a position of the pad 20 relative to the first magnetic element S of the stand 103, wherein the first magnetic element S and the second magnetic element N is magnetically opposite, such that the stand 103 can attach to the back of the pad 20. Furthermore, a third magnetic element S is disposed on a position of the position of the first magnetic element S relative to the fixed seat 301 of the dock 30, wherein the first magnetic element S and the third magnetic element are magnetically identical, so as to automatically unfold the stand 103 when the pad 20 wedges to the fixed seat 301.

Figure 5:
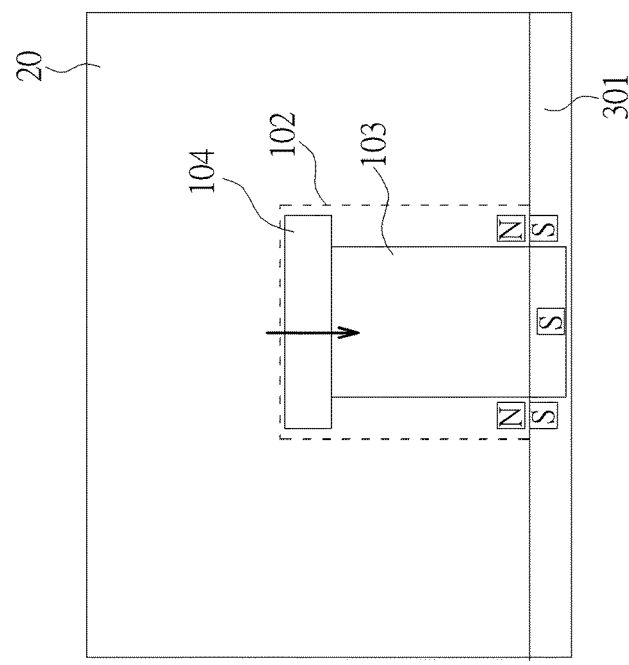
FIG. 5 is a schematic diagram of a rearview of a rotary combination module according to an embodiment of the present invention.
Figure 5:
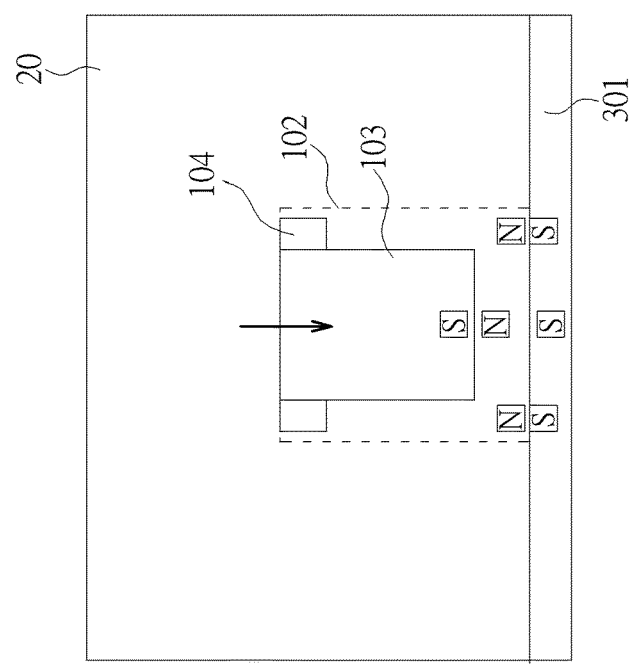

As to the embodiment of the rotary combination module 10 of the present invention, please refer to FIG. 4. FIG. 4 is a schematic diagram of an operation of the rotary combination module 10 of the present invention. In the first stage, the pad 20 is used by horizontal, the stand 103 of the rotary combination module 10 attaches to the pad 20 because of the magnetic force. In the second stage, the pad 20 combines with the dock 30 by the fixed seat 301 of the dock 30, and when the pad 20 approaches the fixed seat 301 of the dock 30, the stand 103 automatically repels the pad 20 because of magnetic repulsion with the same magnetic pole. In the third stage, after the opening of the stand 103 of the rotary combination module 10, the axis 104 automatically flows out, and positioned at a step 104a of the axis 104 by a tenon element 103a. Meanwhile, after a user rotates the fixed seat 301, the stand 103 can lean on the table, such that the two-in-one tablet computer transforms into a laptop mode. Please refer to FIG. 5. FIG. 5 is a rearview diagram of the rotary combination module 10 of the present invention, which illustrates the second and the third stage after the combination of the pad 20 and the dock 30. When the pad 20 combines with the fixed seat 301, the stand 103 of the rotary combination module 10 automatically bounces and flows out of the axis 104 because of the magnetic force. After rotating the fixed seat 301 by the user, the stand 103 of the rotary combination module 10 can lean on the table to support the pad 20, which enhances the stability of the prior arts by merely combining the pad 20 and the dock 30 with the fixed seat 301.

Figure 6A:
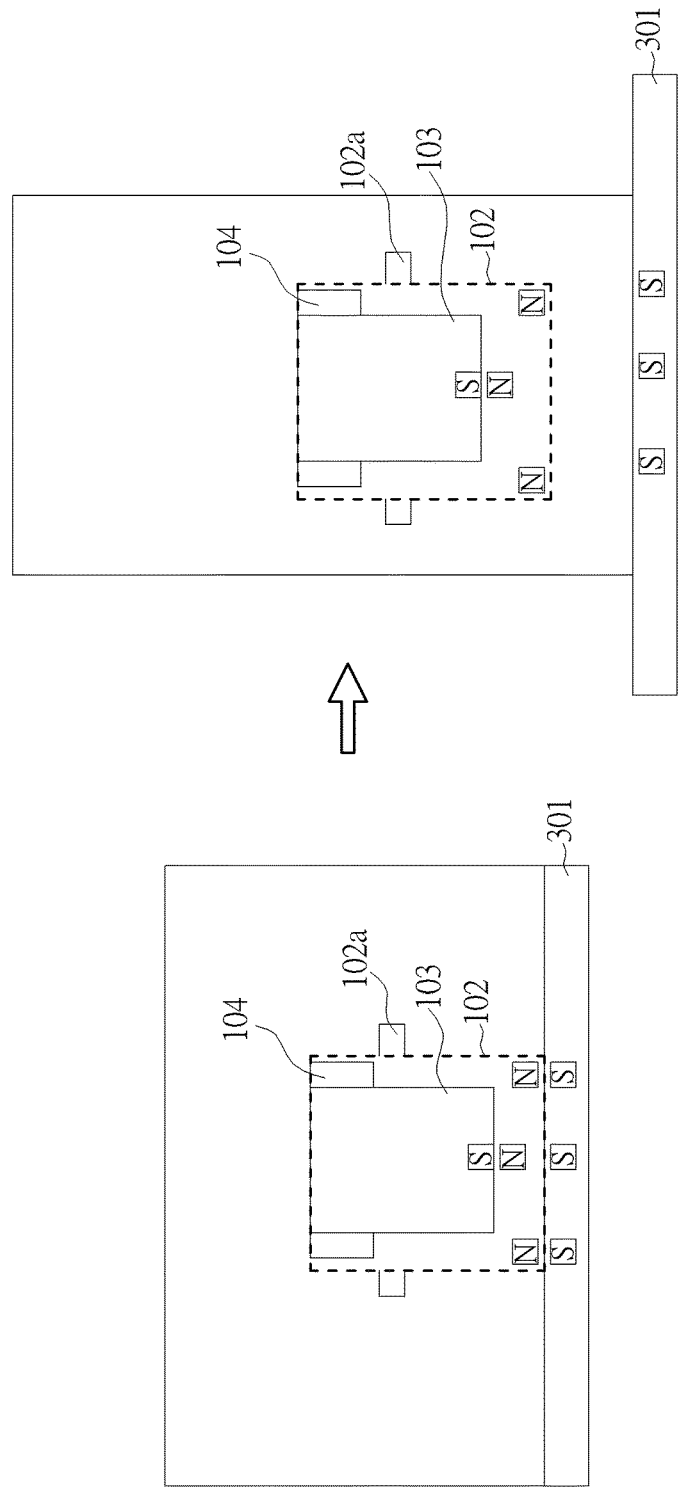
FIGS. 6A and 6B are schematic diagrams of an operation of a rotary combination module in vertical according to an embodiment of the present invention.
Figure 6B:
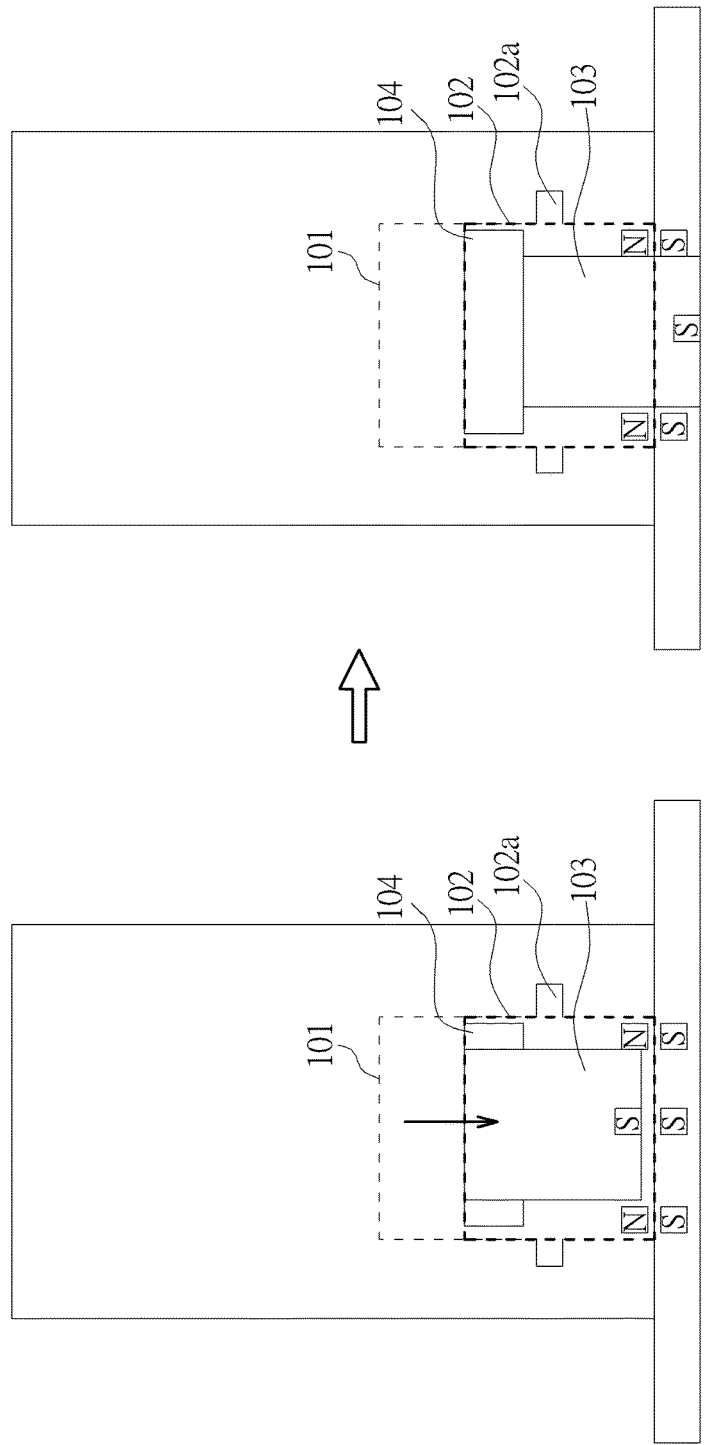

In addition to the horizontal combination, the rotary combination module 10 of the present invention vertically combines the pad 20 with the dock 30. Please refer to FIGS. 6A and 6B. FIGS. 6A and 6B are schematic diagrams of an operation of the rotary combination module 10. In the first stage, the user rotates the pad 20, and combines the pad 20 with the fixed seat 301 of the dock 30. Meanwhile, the user rotates 90 degrees of the rotary combination module 10 by the rotation part 101 of the rotary combination module 10, such that the rotary combination module 10 can face toward the fixed seat 301. The rotary structure of the present invention can be ordinary screw thread or tooth pattern track. In the second stage, the user pulls out the extension part 102 inside the rotation part 101 by pressing the tenon 102a of the extension part 102, and wedges to the mortise 101b from the mortise 101a of the rotation part 101, so as to fix the extension part 102. In the third stage, after pulling out the extension part 102, the stand 103 opens to support the pad 20 from the status of attaching to the pad 20 because of approaching to the fixed seated 30. The operation of the stand 103 can be referred from above, so it is omitted herein.

In an embodiment, as shown in FIG. 3, a data transmission connector 102b is arranged on the extension part 102 to be a physical interface of a data transmission between the pad 20 and the dock 30. The present invention combines the physical transmission interface with the rotary combination module 10, such that the signal between the pad 20 and the dock 30 has advantages of high speed transmission. Furthermore, compared to wireless transmission techniques, which is easily interfered by other frequencies and easily affects signal transmission quality, therefore, in high speed transmission, the physical transmission interface design of the present invention can achieve stable transmission effect. In addition, the physical transmission method enables each assembly on the dock, such as hard disk, display card or extra cooling device, to transmit data and control in a stable way and fortify the dock with every kind of possibilities extending within.

Figure 7:
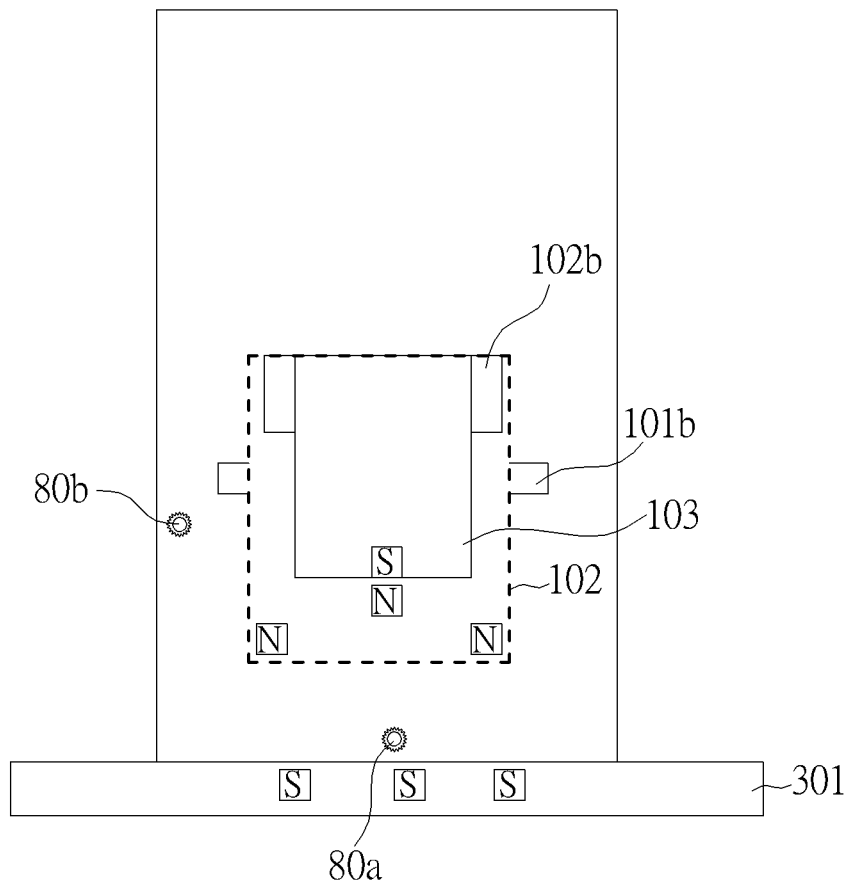
FIG. 7 is a schematic diagram of a magnetic sensor according to an embodiment of the present invention.

In addition, in an embodiment, as shown in FIG. 7, the present invention disposes magnetic sensors on a long side and a short side of the pad 20, such as the Hall sensor, for detecting combination status of the pad 20 and the dock 30, so as to adjust inner down-sampling mechanism of the pad or trigger specific types of applications. Take the vertical combination status for example, when a Hall sensor 80a approaches the fixed seat 301 (which means the Hall sensor 80a detects the third magnetic element S), which triggers the Hall sensor 80a to transmit signal to the pad system, and the pad system determines that the pad 20 is vertically combined with the dock 30, so as to indicate the pad to transform into reading mode. For example, the pad 20 automatically adjusts to appropriate reading brightness and processor operates in a low-power consumption setting, so as to extend the battery life dramatically. Take the horizontal combination status for example, when the Hall sensor 80b approaches the third magnetic element S of the fixed seat 301, the pad system determines that the pad 20 is horizontally combined with the dock 30, so as to increase consumption limit of the processor, operate system in a high efficiency mode, and increase user's working efficiency, or even trigger applications and interfaces user often utilizes to improve user's conveniences. In contrast, when the Hall sensor 80a and 80b do not sense inactivation of the magnetic elements, the pad system enters to an extreme power saving mode, such that the user can utilize the device for a long period of time. In brief, the present invention adds sensors to the pad 20 to detect magnetic elements, such that the user can define his behaviors with the most appropriate processor consumption settings and screen brightness to match user's needs.

The present invention starts from the idea of two-in-one product, and takes multi-directional design as a goal, such that the two-in-one pad can not only combine with the dock horizontally, but also combine with the dock vertically, which thoroughly takes advantages of the wide viewing-angle pad, and improves the user's working experiences. In addition, the present invention enables the pad in vertical status not to fall down because of losing balance and therefore the user can utilize touch pad as fluently as the pad in horizontal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A rotary combination module comprising:
a tablet computer, a pad and a dock, to engage the pad with the dock,
a fixed seat, wherein the fixed seat rotated to adjust leaning angle of the pad;
a rotation part being in U-shape, disposed on the back of the pad, for rotating on the pad as a rotation plane;
an extension part being in rectangular shape; connected with the rotation part by a design of tenon and mortise, for shifting in the rotation part and positioning at a predetermined location,
wherein the design of tenon and mortise is applied with a plurality of penetrated holes spaced apart from each other on the rotation part, and
at least a tenon is corresponding to the plurality of penetrated holes and arranged on the extension part and is capable of being pressed,
whereby the tenon is capable of up-and-down shifting between the plurality of penetrated holes that drives the extension part to move up and down relative to the rotation part;
wherein the tenon is pressed and is positioned at the predetermined location when the tenon is embedded in one of the plurality of penetrated holes; and
a stand; connected to the extension part, for turning away from the extension part and positioning at a predetermined angle; and
a slot, arranged on the back of the pad, that matches a rotating area of the rotation part.

2. The rotary combination module of claim 1, wherein the extension part comprises a data transmission connector, for physically connecting the dock.

3. The rotary combination module of claim 2, wherein the stand comprises a first magnetic element corresponding to a second magnetic element disposed on the pad, for attaching the stand to the pad by magnetism.

4. The rotary combination module of claim 3, wherein the dock comprises a third magnetic element corresponding to the first magnetic element, for repelling the stand from the pad when the pad approaches the dock.

5. The rotary combination module of claim 1, wherein sides of the pad comprises at least a magnetic sensor, for detecting a combination of the pad and the dock.

6. The rotary combination module of claim 5, wherein the magnetic sensor is a Hall sensor.

7. The rotary combination module of claim 1, wherein the rotation part rotates on the pad as the rotation plane by 90 degrees or by multiple degrees of 90 degrees.

8. The rotary combination module of claim 1,
wherein the back of the pad comprises the slot, for restricting the rotating area of the rotation part.

9. The rotary combination module of claim 1, wherein the stand is connected to the extension part by an axis, and the axis is capable of turning over with respect to the extension part, for positioning the stand at the predetermined angle.

10. The rotary combination module of claim 9, wherein the stand and the axis are connected by the design of tenon and mortise.

11. The rotary combination module of claim 10, wherein the design of tenon and mortise is applied with the axis comprises a step, and the stand comprises a tenon element, for restricting a shifting range of the stand by wedging the tenon element in the step.

* * * * *